Figure 1:
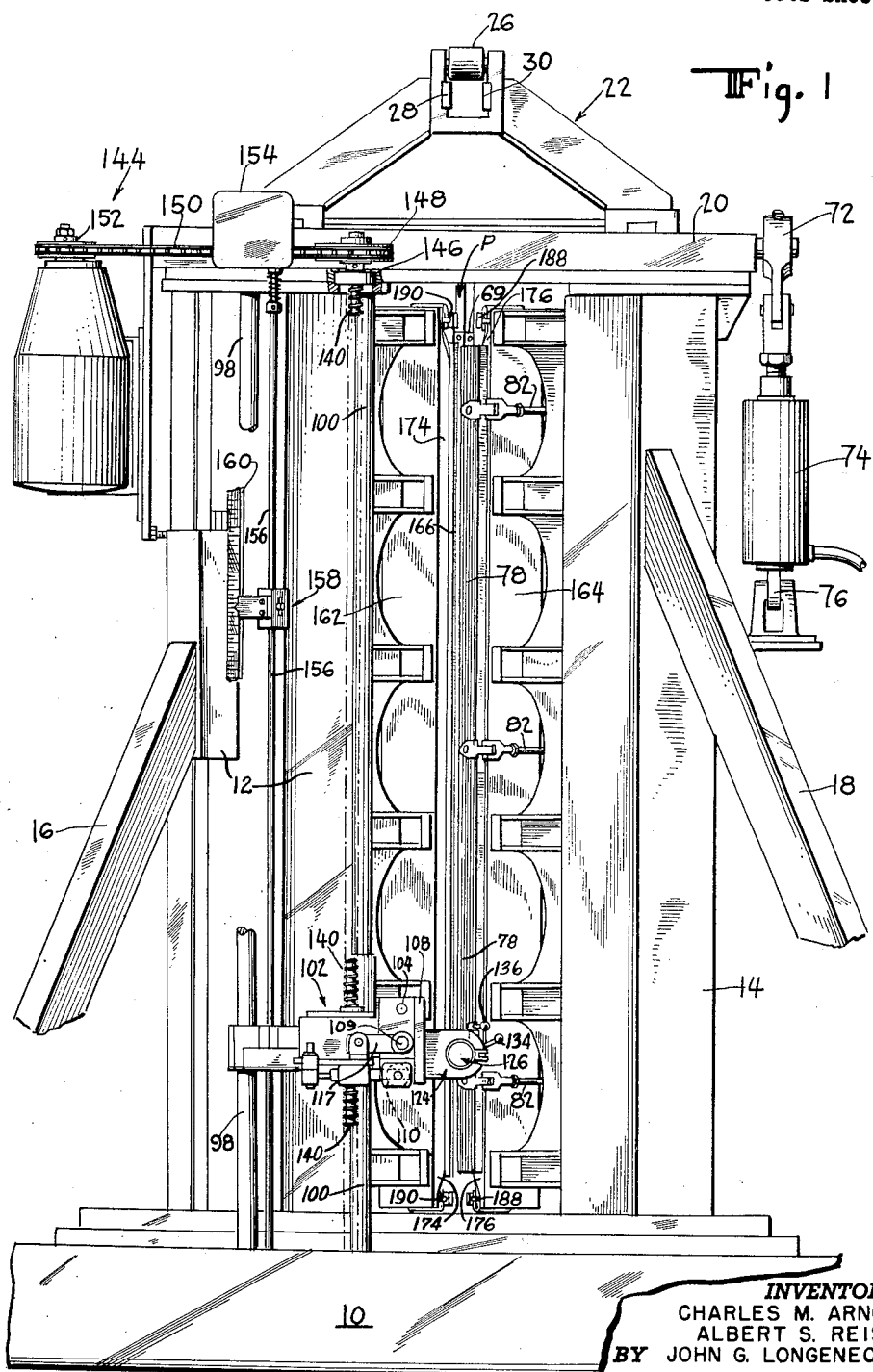

Dec. 11, 1962  J. G. LONGENECKER ETAL  3,068,351
WELDING MACHINE

Filed March 27, 1959  8 Sheets-Sheet 1

INVENTORS
CHARLES M. ARNOLD
ALBERT S. REISS
BY JOHN G. LONGENECKER

ATTORNEY

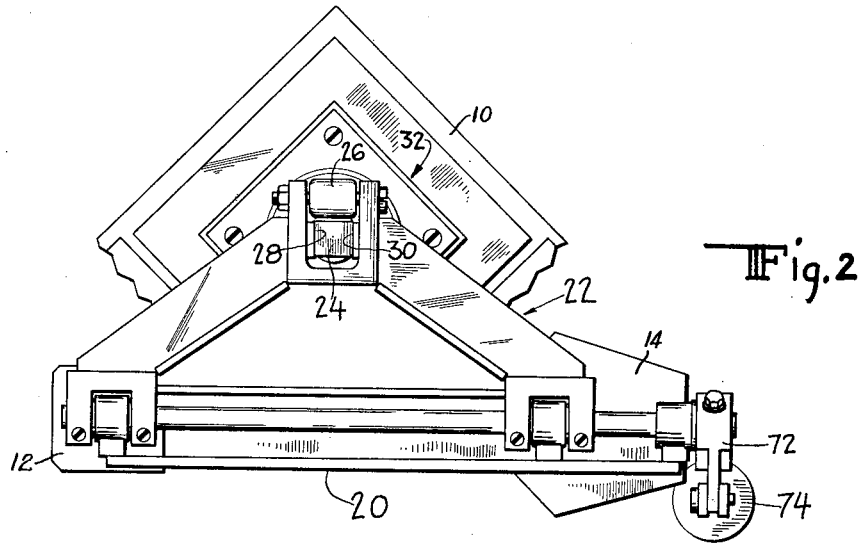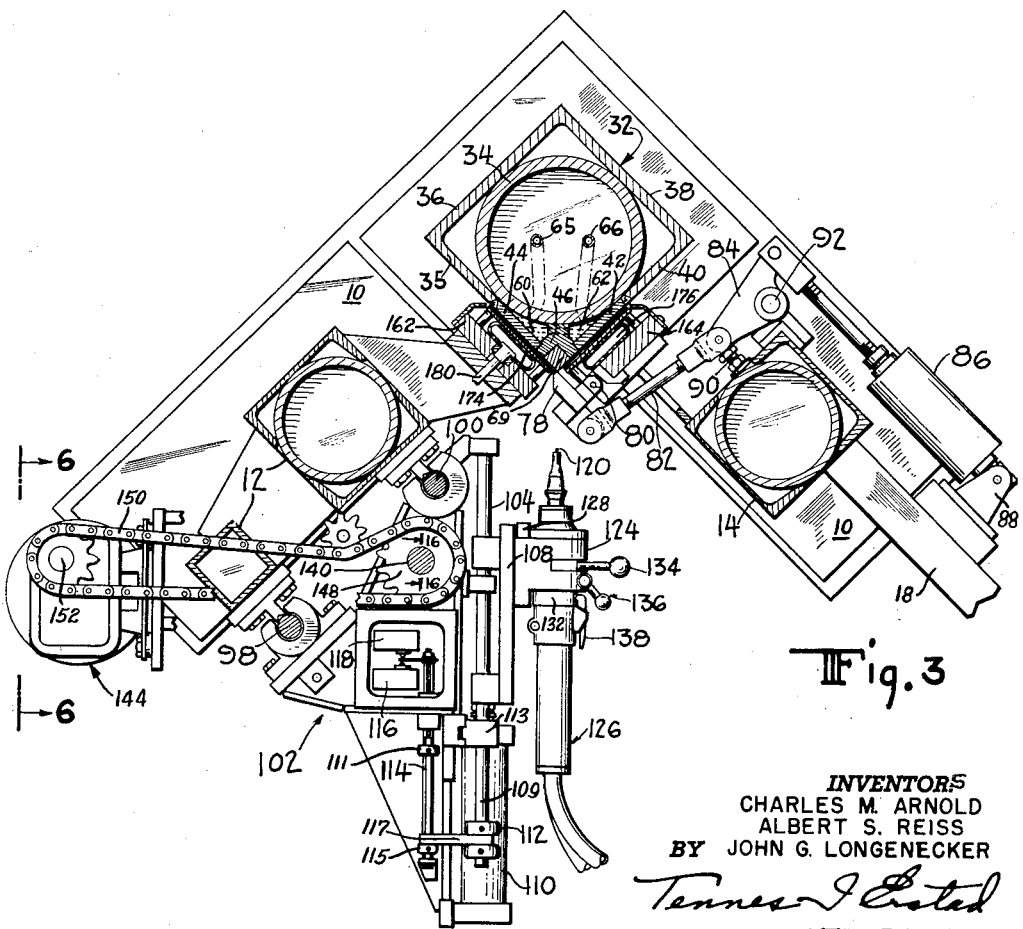

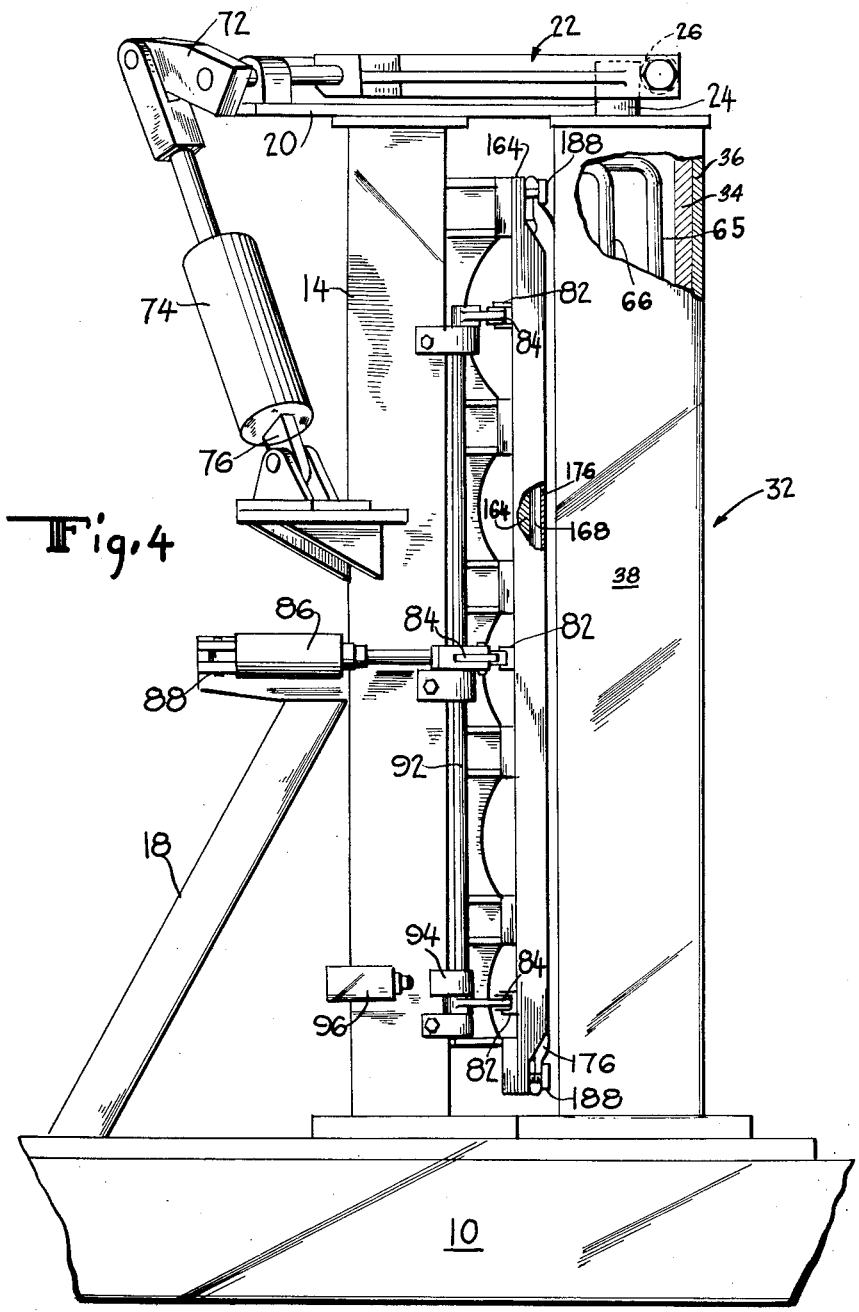

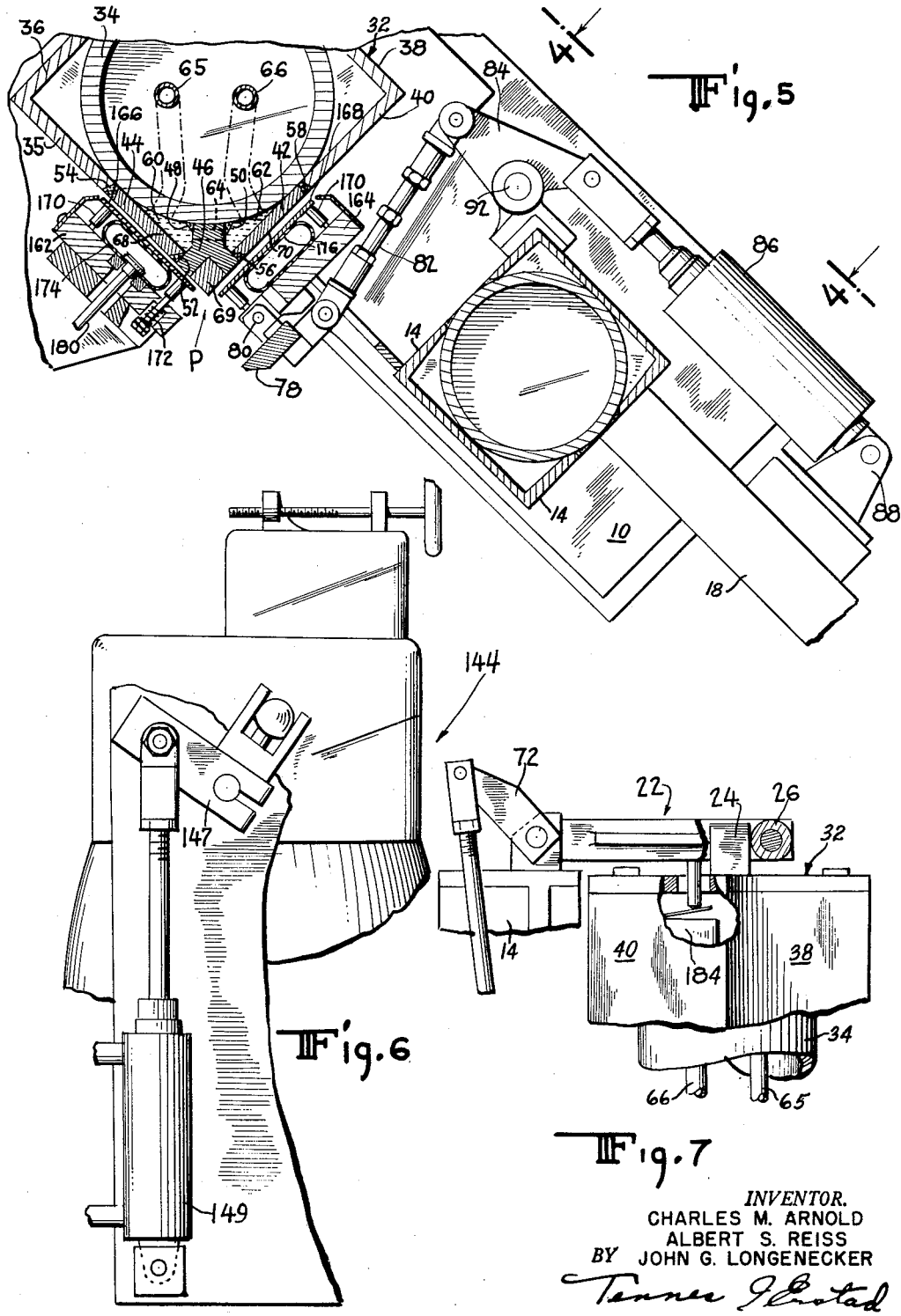

Dec. 11, 1962 J. G. LONGENECKER ETAL 3,068,351
WELDING MACHINE
Filed March 27, 1959 8 Sheets-Sheet 5
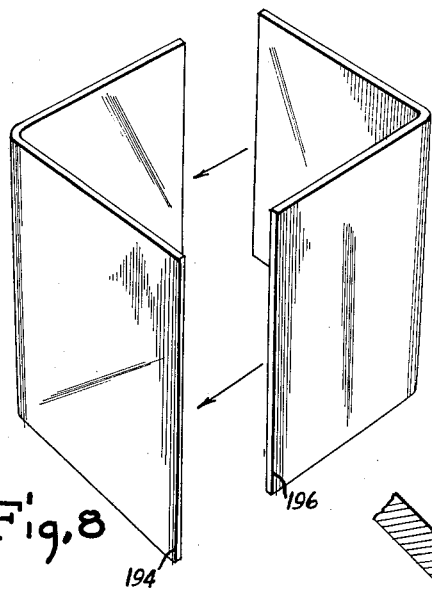
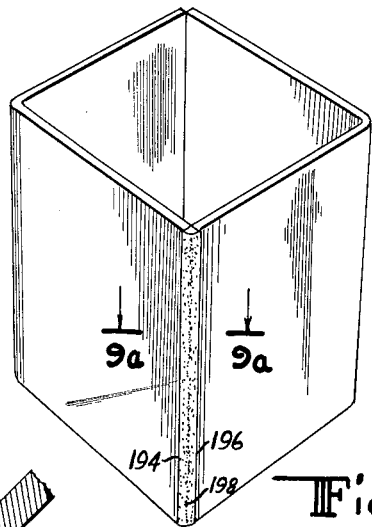
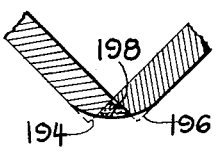
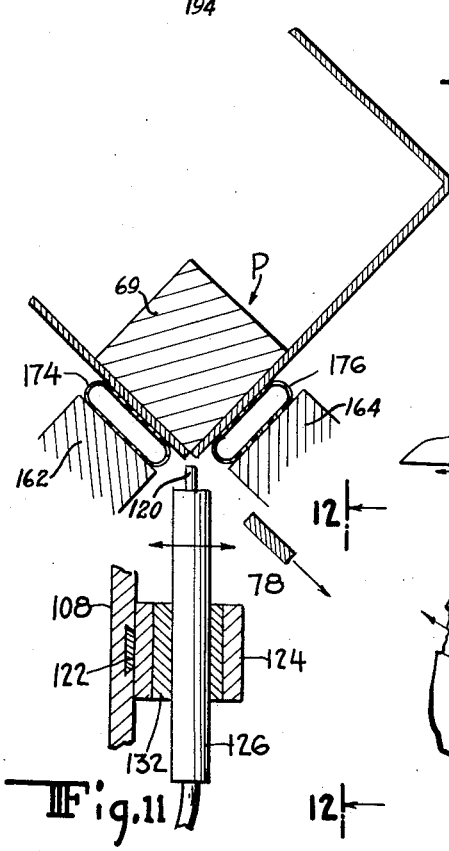
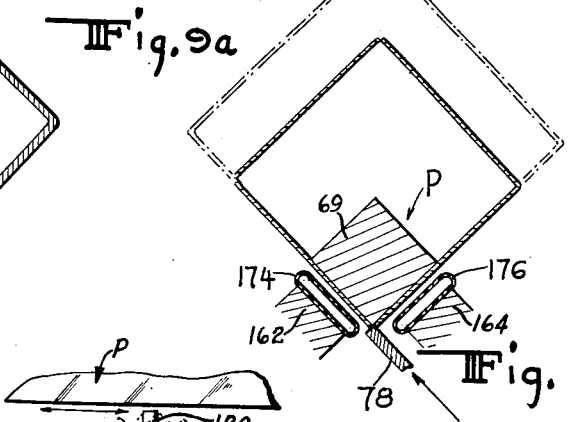
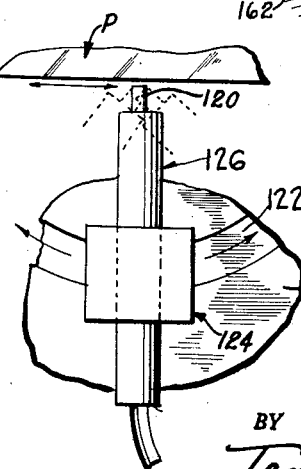
INVENTORS
CHARLES M. ARNOLD
ALBERT S. REISS
BY JOHN G. LONGENECKER
ATTORNEY Dec. 11, 1962  J. G. LONGENECKER ETAL  3,068,351
WELDING MACHINE
Filed March 27, 1959  8 Sheets-Sheet 6

INVENTOR.
CHARLES M. ARNOLD
ALBERT S. REISS
BY JOHN G. LONGENECKER

ATTORNEY

Dec. 11, 1962 J. G. LONGENECKER ETAL 3,068,351
WELDING MACHINE
Filed March 27, 1959 8 Sheets-Sheet 7
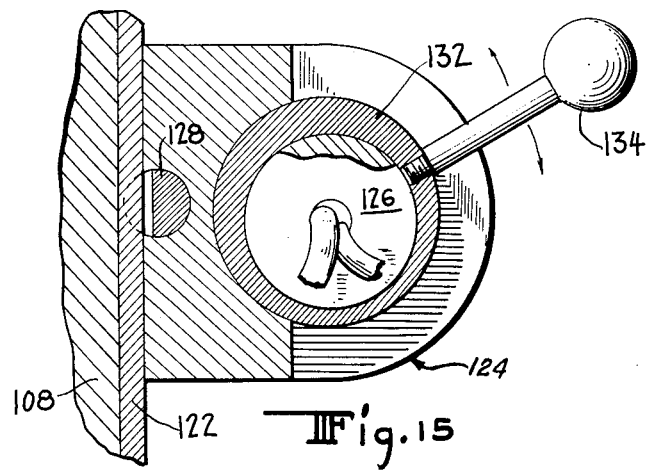
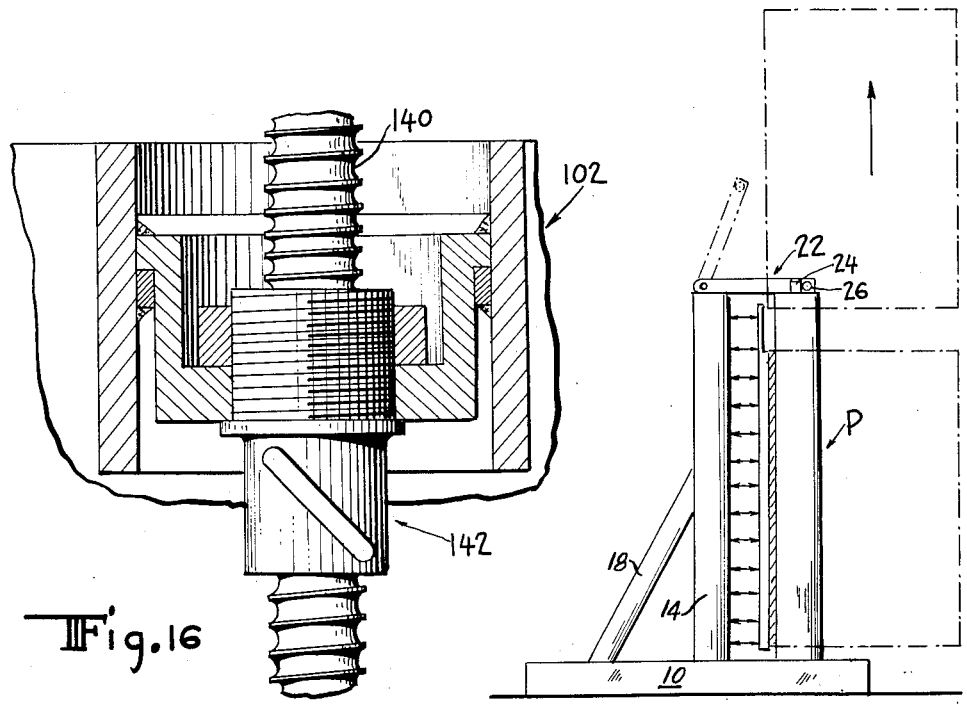
INVENTOR.
CHARLES M. ARNOLD
ALBERT S. REISS
BY JOHN G. LONGENECKER
ATTORNEY

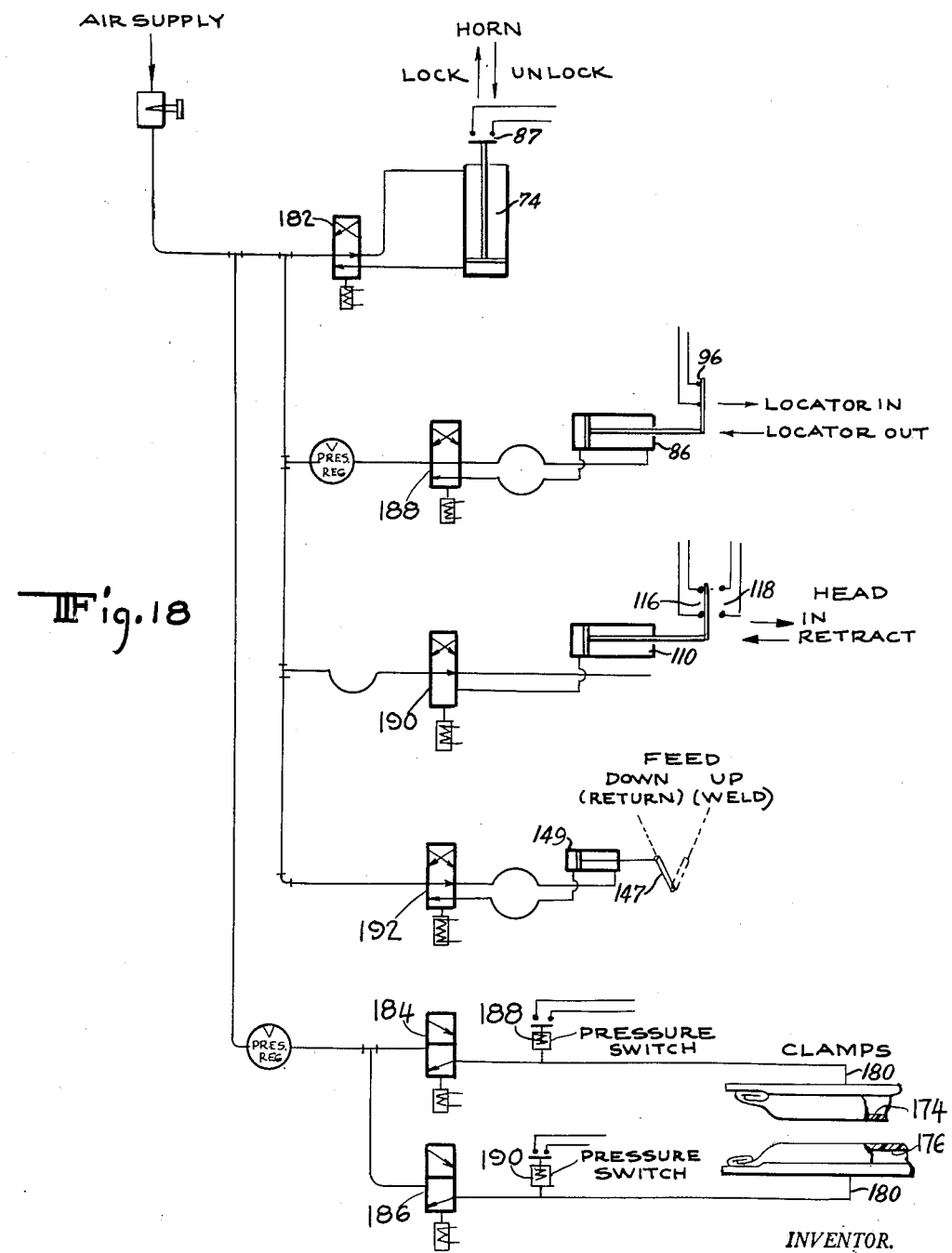

United States Patent Office 3,068,351
Patented Dec. 11, 1962

3,068,351
WELDING MACHINE
John G. Longenecker, Ozone Park, and Charles M. Arnold, Staten Island, N.Y., and Albert S. Reiss, Demarest, N.J., asignors to American Machine & Foundry Company, a corporation of New Jersey
Filed Mar. 27, 1959, Ser. No. 802,376
11 Claims. (Cl. 219—124)

This invention relates to methods and apparatus for welding corner seams.

Heretofore various automatic welding machines have been developed to seam weld metal sheets. However, in general, these machines have been unable to make a weld of such quality that it would closely simulate a sharply bent corner without dressing or polishing.

It is an object of this invention to provide an improved method and apparatus for automatically welding corner seams of adjacent metal plates and especially stainless steel sheets.

Another object of this invention is to provide an improved mechanism for accurately positioning and locating pieces of material to be joined by welding so that a weld will result which simulates a sharply bent corner.

A further object is to provide a work holding fixture which will enable work pieces to be welded to be quickly inserted and removed therefrom even though they be of a very bulky size.

Another object of this invention is to provide an improved clamping device with a yielding face which will smooth out unevenness in metal sheets so that the edges to be welded are properly located and straight and true and which will conform to any surface irregularities of the material being clamped.

Another purpose of this invention is to provide an improved welding fixture which will evenly dissipate the heat generated in adjacent sheets during the welding process so as to avoid any distortion in the finished weld.

A further object is to provide an improved work holding fixture which will be of rigid construction to withstand clamping pressure without distortion to it or the welded product and yet be quickly opened to release and receive material to be worked on.

Another object of this invention is to provide an improved welding head mounting so that the welding electrode precisely moves in a constant path centered in the weld joint and maintains a precise length of arc along the entire seam being welded.

A further object is to provide a uniform weld feed which will result in an improved visual quality of weld which has a smooth finished appearance without the need for dressing or polishing.

A further object is to provide an improved method and apparatus for automatically advancing, positioning and retracting the weld head to prevent contamination of the electrode by contact with any part of the machine or material to be welded.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 13:
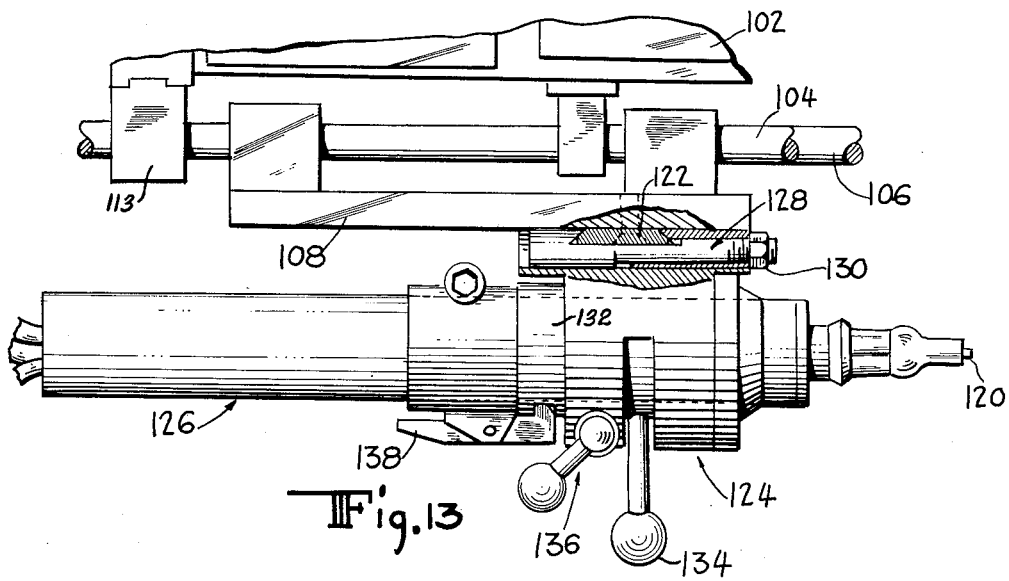
Figure 14:
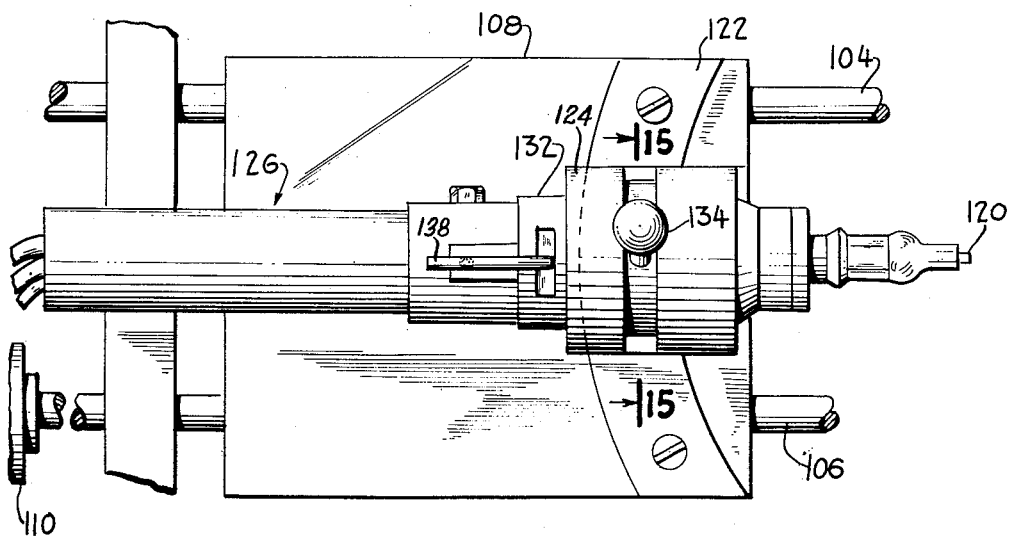

FIGURE 1 is a front elevation of our welding machine.
FIGURE 2 is a plan view of the horn and horn lock.
FIGURE 3 is a sectional plan view through the horn and two main columns showing the electrode and related feed, work locator and clamps.
FIGURE 4 is a side view, taken on the line 4—4 of FIG. 5, showing the horn lock mechanism and the work locator mechanism.
FIGURE 5 is a detail cross section through the horn column, showing the water cooling jackets, air clamping mechanism and the work locator and its operating mechanism.
FIGURE 6 is a side view of the feed reversing mechanism, taken on line 6—6 of FIG. 3.
FIGURE 7 is a fragmentary elevation through the horn locking mechanism.
FIGURE 8 shows the material to be arranged for welding.
FIGURE 9 shows a completed weld.
FIGURE 9A is a cross section of the welded joint taken on line 9a—9a of FIGURE 9.
FIGURE 10 shows the work locator in locating position.
FIGURE 11 shows the related position between the work clamps, electrode and locator.
FIGURE 12 shows the welding head angle adjustment as seen from line 12—12 of FIG. 11.
FIGURE 13 is a top view showing the welding head retracting slide and adjusting mechanisms.
FIGURE 14 is a side view of the mechanism shown in FIGURE 13.
FIGURE 15 shows the eccentric centralizing adjustment.
FIGURE 16 shows the feed screw and nut.
FIGURE 17 is a schematic view showing how the fixture is unloaded.
FIGURE 18 is a schematic view of the electrical and pneumatic controls.

The apparatus employed to illustrate the invention consists of a base 10 having two upright columns 12 and 14. Each column 12 and 14 has a diagonal supporting member 16 and 18 shown in FIGURE 1.

A tie member 20 interconnects the top of vertical columns 12 and 14. A hinged lock 22 is pivotally connected to the member 20 and in the down position engages a horn 24 (FIGURES 2, 4 and 7). The hinged lock has a roller 26 and two side wear strips 28 and 30.

The horn 24 is mounted on top of the work arbor column 32. The column 32 is made up of a vertical cylindrical tube 34 surrounded by flat plates 35, 36, 38, 40, 42 and 44 and a Y section 46.

The Y section 46 is seam welded at 48 and 50 to the tube 34. Plate 44 is seam welded to the Y at weld 52 and to plate 35 and cylinder 34 by weld 54. The plate 42 is welded to the Y 46 by weld 56 and to the tube 34 and plate 40 by weld 58.

The welds 48, 52 and 54 provide a water tight jacket forming chamber 60, while welds 50, 56 and 58 provide water tight jacket forming chamber 62. Chambers 60 and 62 are interconnected at the bottom of Y section 46 by means of a passage 64 (FIG. 5).

Water is piped into the upper end of chamber 60 from pipe 65, then passes through passage 64 into chamber 62 and then out through a pipe 66.

The pipes 65 and 66 are connected to a suitable water system and drain. The water level in chambers 60 and 62 are maintained constant by the inlets and outlets of pipes 65 and 66 being at the top of the chambers 60 and 62.

A copper bar 69 is fastened to the Y section 46 and runs the entire length of the arbor column or horn 32. The straightness and flatness of this copper bar 69 and the adjoining members comprising surface 68 and 70 (FIG. 5) are held to a close tolerance so the material to be welded, when clamped edge to edge, will be in continuous touching contact.

The hinged horn lock 22 is raised and lowered by means of a crank arm 72. The arm 72 is connected to an actuating air cylinder 74 mounted on its base 76.

In order to locate the material accurately prior to clamping, a work locator bar 78 is moved in from the position shown in FIGURE 5 to the position shown in FIGURE 3.

The locator bar 78 is pivotally attached to the column 14 by suitable hinges 80 and is actuated by connecting link 82 and a bell crank 84 by the air cylinder 86, which is mounted to the column bracket 88. A stop 90 (FIGURE 3) locates the full-in position of the locator bar 78.

The bell crank 84 is fixedly mounted on shaft 92 which revolves a cam 94 which in turn actuates a limit switch 96 which detects the position of the locator bar 78.

A vertical feed slide consisting of bars 98 and 100 is mounted on vertical column 12 (FIGS. 1 and 3). A carriage 102 is fitted with bushings to slide vertically on bars 98 and 100. The carriage 102 is also fitted with a nut 142 (FIG. 5) which coacts with a driven screw 140 (FIGS. 1 and 3) for vertical feed.

A horizontal slide guide consisting of rods 104 and 106 (FIGS. 3, 13 and 14) is attached to the vertical carriage 102. Rods 104 and 106 carry a horizontal slide carriage 108 which is actuated by an air cylinder 110 (FIGS. 3 and 14). The forward travel of the horizontal slide carriage 108 is limited by adjustable nut 112 engaging with track support 113 (FIGURE 3) and opposite ends of the length of travel of carriage 108 is detected by the rod 114 actuating switches 116 and 118 (FIGURE 3).

The rod 114 has two stops 111 and 115 which are engaged by arm 117 carried by rod 109. The rod 109 is fixed to the horizontal carriage 108.

In order to adjust the angle of the electrode 120 to the work (see FIGS. 11–15), I have provided a dovetail sector 122 the apex of which is substantially at a tip of the electrode 120. This allows angular adjustment without losing arc length or centralization of the electrode to the work.

A housing 124 for electrode holder 126 is mounted on the dovetail sector 122 and is secured by locking mechanism 128 and nut 130.

Bushing 132 is fitted into housing 124 and it is bored eccentrically to accommodate the electrode holder 126.

Rotation of bushing 132, caused by moving handle 134, will adjust the electrode laterally and it may be locked by clamp 136. In order to secure the holder 126 to the bushing 132, I have provided a suitable quick release latch 138. The electrode 120 and holder 126 is of conventional inert, gas shielded, water cooled design.

Referring to FIGS. 1, 3, 6 and 16, the entire carriage 102 is fed vertically by screw 140 coacting with a nut 142 fixed to carriage 102, the bottom end of the screw 140 being guided in a bushing (not shown) in the base. The upper end of screw 140 is coupled to the feed transmission 144 through a slip clutch 146 having a sprocket 148 driven through chain 150 by sprocket 152 affixed to a conventional reversible variable speed drive transmission 144.

Reversing is accomplished by lever 147, FIGURE 6, and air cylinder 149. A double acting multiple switch 154 (FIG. 1) has a downwardly extending actuating rod 156 which is actuated by the carriage 102 which engages a stop collar (not shown) at the bottom of rod 156 and an adjustable stop and pointer 158 at the top.

A scale 160 is provided to set the machine for the length of weld desired. Multiple contact switch 154 reverses the electrical feed and also retracts the carriage 108 and electrode 120 by means of air cylinder 110.

The clamp structure for securing the work consists of back up plates 162 and 164 (see especially FIGS. 3, 5, 10 and 11). Plate 162 is fastened to column 12 and plate 164 is fastened to column 14.

Spaced from the back up plates 162 and 164 are suitable flexible pressure plates 166 and 168 which are retained by numerous spring loaded pins 170 which yieldably urge plates 166 and 168 towards plates 162 and 164 by means of springs 172.

Interposed between plates 166, 168 and plates 162 and 164 are expandable canvas air bags such as standard fire hoses 174 and 176 (FIGS. 3 and 5). The ends of the hoses 174 and 176 are folded over to make them air tight by clamps (not shown).

Air is introduced to these bags by suitable ducts 180 (FIG. 5) from a suitable pressure supply as shown in the schematic illustration FIGURE 18.

The operation of the apparatus may be briefly described as follows. When the machine is ready to start work, the following conditions will exist:

Water is circulating through the cooling jackets or chambers 60 and 62. The welding electrode is connected to a conventional welding current power supply (not shown). An inert gas such as argon, or helium, is connected to the electrode housing 126 through the welding current supply which opens the flow of gas during welding only. A conventional pre-purge and after purge feature is part of the welding current. A suitable supply of compressed air is connected, as shown in FIGURE 18, to the pneumatic circuit and a suitable source of electricity such as 60 cycle, 110 volt AC is connected to the electrical control system. The operational sequence which will now be described.

In FIGURE 1 the horn lock 22 is held in open position by the air cylinder 74 to facilitate the unloading of the previous corner welded part and to permit the insertion of new sheets which are to be corner welded.

The work locator 78 will be in the position shown in FIGURES 3 and 10 and is actuated via cylinder 86, linkage 82 and bell crank 84.

When the corner of locator 78 is in locating position it will be diagonally opposite to the corner of the copper back up bar 69, so they are corner to corner, as shown in FIGURE 3.

After the material to be welded is inserted in place as shown in FIGURE 10 the inner corners of the material to be welded will also be corner to corner as shown in FIGURE 10.

The slide 108 will also be in the retracted position shown in FIGURE 3 to clear the locator 78. The electrical circuitry is such that both the electrode slide 108 and the locator 78 cannot be in together. If either one is not in fully retracted position, the other is automatically locked out from movement.

The carriage 102 is lowered all the way to the bottom, the bottom position being lower than shown on FIGURE 1.

This completes the description of the static condition of the machine when it is in position to receive new work to be welded.

To start the welding cycle, an operator pushes a switch button which energizes the solenoid operated pneumatic valve 182 which in turn causes the pivoted horn locking mechanism 22 to descend into the locked position as shown in FIGS. 2, 4 and 7. When in locked position a limit switch 184 (FIGURE 7) is energized allowing farther sequential operations to continue.

The sides of one of the sheets to be corner welded is then inserted between the yieldable plate 166 and the face of the corner post "P" consisting of the copper black 69, the Y section 46, and plate 44. The edge of the material is then pushed manually against the work locator 78 and is then slid downward against a suitable bottom stop (not shown).

When this has been done the operator pushes a conventional button or foot switch, conveniently located, to energize the solenoid operating valve 184 shown in FIGURE 18 through a suitable relay (not shown) which opens the solenoid operated air valve 184 allowing air pressure to enter air bag 174.

When this occurs the guidable plate 166 moves outwardly towards column "P" thus clamping the material between plate 166 and column "P."

The other sheet to be welded is inserted on the opposite side between yieldable plate 168 and the face of the column "P" consisting of copper bar 69, Y section 64 and plate 42. Another suitable switch, conveniently located, is then pressed to actuate solenoid operated pneumatic valve 186 which in turn allows air pressure to flow into air bag 176 causing the flexible plate 168 to move towards column P thereby clamping the material.

When either or both of air bags 174 or 176 are pressurized, pressure switches 188 and 190 are energized which in turn lock out the possibility of opening horn lock 22. This is done to prevent the clamping pressure from spreading the columns accidentally if the lock 22 were not down over the horn 24.

With the material clamped and properly in place, the work locator 78 is withdrawn to the position shown in FIGURE 5 by a switch which energizes solenoid operated pneumatic valve 188 which activates cylinder 86 linkage 82 and crank 84.

When the locator is in the full out position, cam 94, (FIG. 4) energizes switch 96 allowing the next cycle to take place.

This cycle advances the electrode support 108 by means of air cylinder 110, bringing the electrode into welding position. This is done by a switch energizing solenoid operated pneumatic valve 190.

When the electrode is in position, the following actions occur in sequence:

A time delay relay (not shown) is energized, pre-purging inert gas, and an arc is struck through high frequency A.C. imposed on the electrode followed by the D.C. arc in a manner well known to the art. The time delay is so fixed as to establish a proper puddle by melting the outside edges 194, 196 of the sheets into the center area of the seam 198 as shown in FIGURE 9A before any feeding or advancement of the electrode takes place.

At the end of this time delay relay cycle, the feed motor 144 and solenoid operated pneumatic valve 192 are energized causing feed screw 140 to turn in a direction as to act on the nut 142 and cause the slide 102 to feed upward, leaving a welded joint in the path of the electrode.

The precise control of the position and movement of the electrode in combination with the precise positioning and clamping of the metal sheets while providing controlled dissipation of heat and temperature of the weld, all as disclosed in accordance with the invention, maintains throughout the entire length of weld a balance between the cohesive forces in the melt and the adhesive forces between the melt and each metal sheet so that the welded joint throughout its entire length assumes the appearance of a sharply bent corner as shown in FIGURES 9 and 9A without any finishing or buffing operation being required. It will be noted in FIGURES 9 and 9A that in welding this corner joint, as mentioned, the corners 194 and 196, shown in dotted outline in FIG. 9a, are melted and fused together in the corner area 198 of the two edges.

The upward travel of the electrode is fixed by the location of the adjustable stop collar 158 shown in FIGURE 1 and is set by scale 160. When the carriage 102 contacts the stop collar 158 and carries it upward, the rod 156 energizes multiple contact switches 154, de-energizes solenoid 190 in FIGURE 18 to retract the electrode head and de-energizes solenoid 192 to actuate air cylinder 149 FIGS. 6 and 18 to reverse the feed.

When the head feeds down to the starting point, rod 156 will be moved downward causing multiple contact switch 154 to de-energize and stop the feed motor. During this return cycle the welded piece can be removed. The removal is accomplished in the following manner.

Solenoid operated switches 184, 186 are de-energized manually allowing the pressure to escape from the bags 174 and 176.

Pressure switches 188 and 190 sense the loss of pressure and will allow the horn lock 22 to be raised. The material is then removed upwardly and out of the arbor thus completing the cycle.

The weld joint that is achieved by this welding process then only has to be cleaned with a suitable acid, such as phosphoric acid, having an electrolytic effect which instantly removes the slight discoloration.

No grinding or buffing operation is necessary because the welded joint obtained is smooth, devoid of irregularities and appears similar to a sharply bent corner.

On inspecting corners made in accordance with the invention, it has been found that weld penetration was complete and was visible on the inside of the welded corner, no cracks being visible. Samples have been tested by closing the corner from 90° to zero ° and no cracks or fracturing have occurred.

Samples have also been bent from 90 to 180° with similar results. Samples have also been X-rayed from two directions and no imperfections were visible.

It will therefore be evident that not only has there been provided a weld with an unusually acceptable appearance but also one which has remarkable strength qualities and characteristics.

The invention hereinafter described may therefore be varied in construction within the scope of the claims, for the particular device selected to illustrate the invention, is but one of many possible embodiments of the same. The invention, therefore, is not to be restricted to the precise details of the structure shown and described.

What is claimed is:

1. In an automatic welding machine, a clamping means to hold a pair of metal sheets in lineal seam welding relationship, an electrode movable to and from said seam along a first reference axis perpendicular to said seam and along a second reference axis parallel to said seam, a first means for moving said electrode along said first reference axis in a forward and retracting direction, a second means for moving said electrode along said second reference axis in a feed and reverse direction and a synchronizing means for said first and second means to effect forward movement of said electrode along said first reference axis to establish an arc with said pair of metal sheets along said seam, thereafter forward feed movement of said electrode along said second reference axis and thereafter retraction movement of said electrode from said seam and reverse movement of said electrode parallel to said second reference axis, said clamping means including a corner back-up device having a pair of adjacent surfaces engageable respectively with the surfaces of the said pair of metal sheets behind said seam means for cooling said surfaces and flexible plates yieldably forcing each of said metal sheets against said corner back-up device.

2. In an automatic welding machine, a clamping means to hold a pair of metal sheets in lineal seam welding relationship, an electrode movable to and from said seam along a first reference axis perpendicular to said seam and along a second reference axis parallel to said seam, a first means for moving said electrode along said first reference axis in a forward and retracting direction, a second means for moving said electrode along said second reference axis in a feed and reverse direction and a synchronizing means for said first and second means to effect forward movement of said electrode along said first reference axis to establish an arc with said pair of metal sheets along said seam, thereafter forward feed movement of said electrode along said second reference axis and thereafter retraction movement of said electrode from said seam and reverse movement of said electrode parallel to said second reference axis, said clamping means including a corner back-up device having a pair of adjacent surfaces engageable respectively with the surfaces of the said pair of metal sheets behind said seam and flexible plates; yieldably forcing each of said metal sheets against said corner back-up device, and a hinged corner back-up lock, said corner back-up device being fixed at one end to said machine and being firmly supported at the other end by engagement with said hinged corner back-up lock.

3. In an automatic welding machine, a clamping means to hold a pair of metal sheets in lineal seam welding relationship, an electrode movable to and from said seam along a first reference axis perpendicular to said seam and along a second reference axis parallel to said seam, a first means for moving said electrode along said first reference axis in a forward and retracting direction, a second means for moving said electrode along said second reference axis in a feed and reverse direction and a synchronizing means for said first and second means to effect forward movement of said electrode along said first reference axis to establish an arc with said pair of metal sheets along said seam, thereafter forward feed movement of said electrode along said second reference axis and thereafter retraction movement of said electrode from said seam and reverse movement of said electrode parallel to said second reference axis, said clamping means including a corner back-up device having a pair of adjacent surfaces engageable respectively with the surfaces of the said pair of metal sheets behind said seam and flexible plates, yieldably forcing each each of said metal sheets against said corner back-up device, a hinged corner back-up lock, said corner back-up device being fixed at one end to said machine and being firmly supported at the other end by engagement with said hinged corner back-up lock, said corner back-up device comprising a highly heat conductive corner post running substantially the length of said seam having water-cooled chambers a metal Y member connected to said corner post and running the length thereof, the arms of said Y member being in straddling contact with said corner post and end engageable with said pair of metal sheets, and a plate connected to each arm of the Y member, the surfaces of said corner post, the ends of the arms of the Y member, said plates being aligned to flushly engage said pair of metal sheets.

4. In an automatic welding machine, a clamping means to hold a pair of metal sheets in lineal seam welding relationship, an electrode movable to and from said seam along a first reference axis perpendicular to said seam and along a second reference axis parallel to said seam, a first means for moving said electrode along said first reference axis in a forward and retracting direction, a second means for moving said electrode along said second reference axis in a feed and reverse direction and a synchronizing means for said first and second means to effect forward movement of said electrode along said first reference axis to establish an arc with said pair of metal sheets along said seam, thereafter forward feed movement of said electrode along said second reference axis and thereafter retraction movement of said electrode from said seam and reverse movement of said electrode parallel to said reference axis, said clamping means including a cooled corner back-up device having a pair of adjacent surfaces engageable respectively with the surfaces of the said pair of metal sheets behind said seam, a pair of flexible plates forcing each of said metal sheets against said corner back-up device, a base member fixed to said machine for supporting said flexible plates, each plate being yieldably spaced from said base member, an inflatable member disposed between said base member and each of said plates and means supplying pressured fluid to said inflatable member.

5. In an automatic welding machine, a clamping means to hold a pair of metal sheets in lineal seam welding relationship, an electrode movable to and from said seam along a first reference axis perpendicular to said seam and along a second reference axis parallel to said seam, a first means for moving said electrode along said first reference axis in a forward and retracting direction, a second means for moving said electrode along said second reference axis in a feed and reverse direction and a synchronizing means for said first and second means to effect forward movement of said electrode along said first reference axis to establish an arc with said pair of metal sheets along said seam, thereafter forward feed movement of said electrode along said second reference axis and thereafter retraction movement of said electrode from said seam and reverse movement of said electrode parallel to said reference axis, said clamping means including a cooled corner back-up device having a pair of adjacent surfaces engageable respectively with the surfaces of the said pair of metal sheets behind said seam, a pair of flexible plates forcing each of said metal sheets against said corner back-up device, a base member fixed to said machine for supporting said flexible plates, each plate being yieldably spaced from said base member, an inflatable member disposed between said base member and each of said plates, means supplying pressured fluid to said inflatable member, and a work locator comprising a pivoted member swingable to and from said corner back-up device, said pivoted member having a pair of shoulders engageable respectively with the edges of each of said metal sheets to be welded to position them in lineal seam welding relationship, and pneumatic means selectively moving said pivoted member.

6. The machine according to claim 3 wherein there is provided means for circulating cooling water in the region behind said plates and said Y member.

7. The invention according to claim 2 wherein the said other end of the corner back-up device has a protruding post fixed thereto and the said hinged corner back-up lock has an opening including a roller therein adapted to securely engage said protruding post.

8. In an automatic welding machine, a clamping means to hold a pair of metal sheets in lineal seam welding relationship, an electrode movable to and from said seam along a first reference axis perpendicular to said seam and along a second reference axis parallel to said seam, a first means for moving said electrode along said first reference axis in a forward and retracting direction, a second means for moving said electrode along said second reference axis in a feed and reverse direction and a synchronizing means for said first and second means to effect forward movement of said electrode along said first reference axis to establish an arc with said pair of metal sheets along said seam, thereafter forward feed movement of said electrode along said record reference axis and thereafter retraction movement of said electrode from said seam and reverse movement of said electrode parallel to said second reference axis, said clamping means including a corner back-up device having a pair of adjacent surfaces engageable respectively with the surfaces of the said pair of metal sheets behind said seam, a pair of flexible plates forcing each of said metal sheets against said corner back-up device, a base member fixed to said machine for supporting said flexible plates, each plate being yieldably spaced from said base member, a pneumatic member disposed between said base member and said plate and means supplying pressured gas to said pneumatic member, a hinged corner back-up lock, said corner back-up device being fixed at one end to said machine and being firmly scpported at the other end by engagement with said hinged corner back-up lock said synchronizing means including an interlocking circuit to prevent the introduction of gas into said pneumatic members unless said lock is firmly engaged with said other end of said corner back-up device.

9. In an automatic welding machine, a clamping means to hold a pair of metal sheets in lineal seam welding relationship, an electrode movable to and from said seam along a first reference axis perpendicular to said seam and along a second reference axis parallel to said seam, a first means for moving said electrode along said first reference axis in a forward and retracting direction, a second means for moving said electrode along said second reference axis in a feed and reverse direction and a synchronizing means for said first and second means to effect forward movement of said electrode along said first reference axis to establish an arc with said pair of metal sheets along said seam, thereafter forward feed movement of said electrode along said record reference axis and thereafter retraction movement of said electrode from said seam and reverse movement of said electrode parallel to said second reference axis, said clamping means including a corner backup device having a pair of adjacent surfaces engageable respectively with the surfaces of the said pair of metal sheets behind said seam, said synchronizing means comprising a rod slidably disposed along an axis parallel to said second reference axis, a member adjustably positioned along said rod, a finger carried by said electrode to engage said member as the electrode reaches a predetermined point along said second reference axis, and switch means responsive to a sliding movement of said rod to control said first and second means.

10. The machine according to claim 9 wherein there is provided electrical energy means for said electrode and said switching means also interrupts said electrical energy means.

11. In an automatic welding machine, a clamping means to hold a pair of metal sheets in lineal seam welding relationship, an electrode movable to and from said seam along a first reference axis perpendicular to said seam and along a second reference axis parallel to said seam, a first means for moving said electrode along said first reference axis in a forward and retracting direction, a second means for moving said electrode along said second reference axis in a feed and reverse direction and a synchronizing means for said first and second means to effect forward movement of said electrode along said first reference axis to establish an arc with said pair of metal sheets along said seam, thereafter forward feed movement of said electrode along said second reference axis and thereafter retraction movement of said electrode from said seam and reverse movement of said electrode parallel to said second reference axis, said clamping means including a corner back-up device having a pair of adjacent surfaces engageable respectively with the surfaces of the said pair of metal sheets behind said seam, means for yieldably forcing each of said metal sheets against said corner backup device, said last mentioned means comprising a pair of flexible plates, each plate being positioned to press one of said metal sheets against said corner back-up device, and an inflatable member for yieldably forcing each flexible plate against its associated metal sheet.

References Cited in the file of this patent

UNITED STATES PATENTS

| | | |
|---|---|---|
| 359,380 | Ballou | Mar. 15, 1887 |
| 1,305,039 | Wagner | May 27, 1919 |
| 1,540,705 | Noble | June 2, 1925 |
| 1,546,250 | Phillips | July 14, 1925 |
| 1,831,343 | Caldwell | Nov. 10, 1931 |
| 2,068,166 | Dodge | Jan. 19, 1937 |
| 2,176,664 | Burke | Oct. 17, 1939 |
| 2,282,031 | Catlett | May 5, 1942 |
| 2,371,823 | Jackson | Mar. 20, 1945 |
| 2,416,379 | Cohn | Feb. 25, 1947 |
| 2,512,705 | Anderson | June 27, 1950 |
| 2,631,215 | Randall et al. | Mar. 10, 1953 |
| 2,724,036 | Hess | Nov. 15, 1955 |
| 2,743,692 | Wietzel et al. | May 1, 1956 |
| 2,903,566 | Launder et al. | Sept. 8, 1959 |
| 2,922,870 | Collins | Jan. 26, 1960 |
| 2,927,992 | Bateman | Mar. 8, 1960 |
| 2,975,266 | Heath et al. | Mar. 14, 1961 |